United States Patent
Denis

(10) Patent No.: US 7,801,663 B2
(45) Date of Patent: Sep. 21, 2010

(54) METHOD FOR IDENTIFYING THE THRESHOLDS AT WHICH POLLUTANT GASES ARE EMITTED WITH A VIEW TO CONTROLLING THE OPERATION OF A MOTOR VEHICLE IN STOP AND START MODE

(75) Inventor: Jean-Christophe Denis, Puteaux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 193 days.

(21) Appl. No.: 12/282,350

(22) PCT Filed: Mar. 13, 2006

(86) PCT No.: PCT/FR2006/050215

§ 371 (c)(1),
(2), (4) Date: Sep. 9, 2008

(87) PCT Pub. No.: WO2007/104840

PCT Pub. Date: Sep. 20, 2007

(65) Prior Publication Data

US 2009/0055075 A1    Feb. 26, 2009

(51) Int. Cl.
*F02D 45/00* (2006.01)
(52) U.S. Cl. .................... 701/102; 123/179.4
(58) Field of Classification Search .............. 701/102, 701/103–105, 113; 123/179.4
See application file for complete search history.

(56) References Cited

U.S. PATENT DOCUMENTS

| 7,347,175 B2 * | 3/2008 | Lupo et al. ............... 123/179.4 |
| 2002/0157651 A1 | 10/2002 | Hasegawa et al. |
| 2003/0087724 A1 | 5/2003 | Seibertz et al. |
| 2004/0206325 A1 | 10/2004 | Momcilovich et al. |

FOREIGN PATENT DOCUMENTS

| FR | 2858665 A | 2/2005 |
| FR | 2883035 A1 | 9/2006 |
| GB | 2390438 A | 1/2004 |

OTHER PUBLICATIONS

International Search Report mailed Jul. 5, 2007 in PCT/FR2006/050215.

* cited by examiner

*Primary Examiner*—Hieu T Vo
(74) *Attorney, Agent, or Firm*—Nicholas E. Seckel

(57) ABSTRACT

Method for identifying the thresholds at which pollutant gases are emitted with a view to controlling the operation in "stop and start" mode by stopping an engine just before and while a motor vehicle is stationary, whereby, upon each re-start, the amount of fuel injected is calculated, and the difference between the amount of fuel injected and the normal amount of fuel needed is calculated, the said resulting quantity being considered to represent the amount of fuel that was injected but not burnt; the said amount of fuel injected but not burnt is then compared against a predetermined threshold value, according to the distance covered, and finally, "stop and start" operation is or is not inhibited according to whether the said amount of fuel injected but not burnt is above or below the predetermined threshold value.

6 Claims, 1 Drawing Sheet

METHOD FOR IDENTIFYING THE THRESHOLDS AT WHICH POLLUTANT GASES ARE EMITTED WITH A VIEW TO CONTROLLING THE OPERATION OF A MOTOR VEHICLE IN STOP AND START MODE

The present invention relates to a method for identifying emissions thresholds for pollutant gases for purposes of controlling the stop-and-start mode operation of stopping an engine just before and during a motor vehicle standstill, and restarting it instantly at the first driver demand.

The stop-and-start system (ST) is a system in which the engine stops just before and during the vehicle standstill (traffic lights, traffic jams, etc.). The system automatically and instantly turns back on as soon as the brake pedal is released by the driver when the latter wants to proceed.

The emissions thresholds can be the thresholds defined by EOBD, for example. EOBD (European On-Board Diagnosis) is a European regulation that goes with the EURO 3 standard. EOBD aims to alert the driver via the check engine light to any fault affecting pollution control due to a threshold being exceeded. EOBD is a monitoring program integrated into the engine control computer; it has two main functions: detecting failures in the vehicle's pollution control equipment, and alerting the driver to failures that result in exceeding an emissions threshold so that he can have the vehicle repaired.

The risk concerning EOBD lies in the increasing number of difficult restarts over the course of the cycle, which can result in exceeding the OBD ("On-Board Diagnosis") emissions thresholds. With the development of the new stop-and-start system functions, the engine stops and restarts up to 12 times per MVEG cycle, i.e., per homologation cycle for vehicles in Europe according to the European standards in effect.

The purpose of the present invention is to reduce the impact of these stops/restarts on emissions of pollutant gases such as HC, CO and NOx.

In the event that a problem with the function leads to abnormally high emissions, it is advisable to deactivate the stop-and-start function before the latter causes the vehicle to exceed the "gross polluters" thresholds.

In order to achieve this goal, the method of the invention includes:

a) calculating, at each restart, the quantity of fuel injected is calculated, b) calculating the difference between the quantity of fuel injected and the normal quantity of fuel needed, the resulting quantity being taken to represent the quantity of fuel injected but not burned, c) comparing said quantity of fuel injected but not burned to a preset threshold value based on the distance driven, d) deactivating or not the stop-and-start mode operation, according to whether or not said quantity of fuel injected but not burned is greater than the preset threshold value.

According to the preferred embodiment of the invention, the quantity of fuel injected but not burned is calculated by iterative summation, in such a way as to calculate the sum of the fuel quantities injected but not burned for a series of restarts between two engine restarts by means of the ignition key.

According to the preferred embodiment of the invention, each time the distance driven counter returns to zero, the value of the sum of the fuel quantities injected but not burned is reinitialized to a value obtained by subtracting a preset threshold value from said sum just before reinitialization when this difference is positive, and it is reinitialized to zero when said difference is negative.

Preferably, the method is repeated over the course of at least three driving cycles, and it additionally comprises the following step:

a) recording each time said fuel quantity injected but not burned exceeds the preset threshold value, b) issuing a fault code if said threshold is exceeded for three driving cycles.

Other characteristics and advantages of the present invention will now be described in more detail using the attached illustrative, non-limiting drawings in which.

Figure 1:
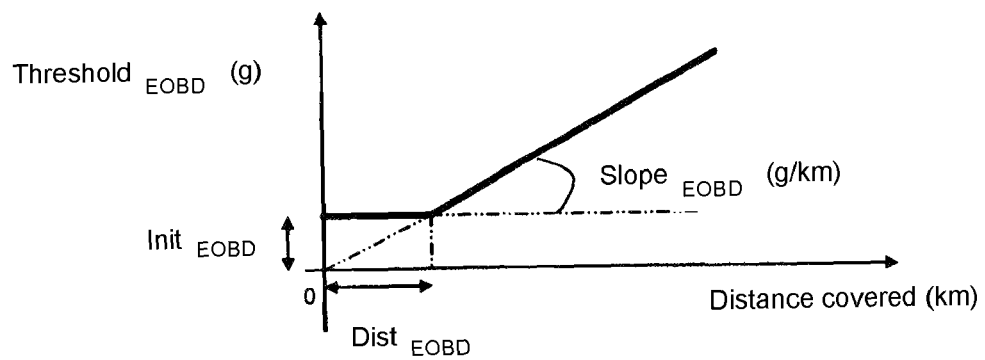
FIG. 1 is a graph representing an emissions threshold according to EOBD (also designated "EOBD Threshold" template) as a function of the distance driven since the ignition switch was activated by the ignition key.

In order to identify the malfunction process due to accumulating difficult restarts over the homologation cycle, which can result in exceeding the OBD emissions thresholds, a restart quality indicator is defined, as set out below. Depending on the level of this restart indicator compared to a reference value, the engine can operate in stop-and-start mode or not.

According to the principle of the present invention, at each restart, the quantity of fuel injected is calculated and compared to the nominal fuel quantity needed. The difference between these two quantities is considered to be the gasoline that was injected and did not burn, which consequently ends up in the exhaust. Next, this quantity is compared to the "gross polluter" limit for levels of unburned hydrocarbons (HC) for the distance driven. Depending on the results of this comparison, the stop-and-start function is or is not deactivated, as will be explained below.

Each cycle between two starts with the ignition key has a series of start-restarts that can be labeled 1, 2, ..., i, ...

First, the sum of the quantities of gasoline injected $T_{inj}$ during a (re)start is calculated (in grams). From this value, the nominal quantity $M_{nom}$ is subtracted, itself a function of the water temperature necessary for (re)starting. The quantity of gasoline injected that did not burn (Ti) is thereby deduced:

$Ti = (L\ T_{inj}) - M_{nom}$

Note that the value of Ti is not less than 0.

At each (re)start, a counter that sums these unburned gas values Ti is increased by increments. This counter "Sum Ti" is initialized to 0 at each key start ignition.

Sum Ti=L Ti (when restarting)

Next, the value of the "Distance Driven" since the key start is obtained.

The stop-and-start function is deactivated if the following inequality applies, that is, IF:

Sum Ti>Threshold$_{EOBD}$

The template "EOBD Threshold" is defined by three calibratable parameters, namely, Init$_{EOBD}$, Dist$_{EOBD}$ and Slope$_{EOBD}$. It exhibits the form shown in the drawing in FIG. 1 as a function of said distance driven.

As can be seen in the drawing in FIG. 1, the curve has an initial flat section that is intended to authorize stop-and-start, even after an initial difficult start. It is parameterized by "Init$_{EOBD}$" on the ordinate axis or EOBD threshold axis and by "Dist$_{EOBD}$" on the abscissa axis or distance driven axis. Next, the slope (Slope$_{EOBD}$) makes it possible to ensure compliance with the criterion of the EOBD standard. The value of Slope$_{EOBD}$ is that of the line segment joining the origin O to the parameterized point with coordinates Init$_{EOBD}$ and Dist$_{EOBD}$. The origin O corresponds to the ignition key start.

Figure 2:
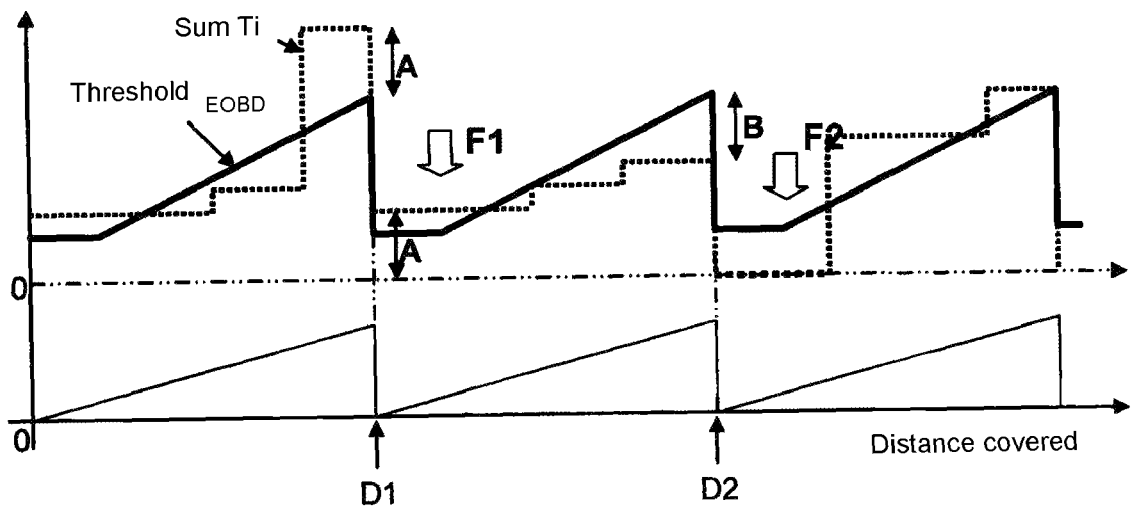
FIG. 2 is a graph representing the change over time in the level of the restart quality indicator parameter according to the present invention, which parameter level controls whether or not the engine is put in stop-and-start mode.

Referring next to FIG. 2, the counter "Sum Ti" is reinitialized when the distance driven counter returns to 0, i.e., at Dl, D2, etc. The value of Sum Ti is represented by the dotted-line stepped curve. It is reinitialized, not to the value 0, but to the difference between the counter "Sum Ti" and the template "Threshold$_{EOBD}$" at maximum distance driven, the value of said template being represented by a solid line in the drawing in FIG. 2. Reinitialization is always positive (the positive "pollution reserve" just before reinitialization, if any, is not taken into account).

Thus, still referring to FIG. 2, at the first reinitialization, indicated by the arrow F1, the counter Sum Ti is reinitialized to the value A, which corresponds to the same value A representing the difference between the value of Sum Ti and the value of Threshold$_{EOBD}$ at the first maximum distance driven D1. At the second reinitialization, indicated by the arrow F2, since the difference B between the value of Sum Ti and the template Threshold$_{EOBD}$ is negative, Sum Ti is reinitialized to zero at D2 (second max. distance driven).

If the value of Sum Ti has exceeded the value of Threshold$_{EOBD}$, the stop-and-start function is active again as soon as the value of Sum Ti returns below the value of Threshold$_{EOBD}$. It should be noted that all of the thresholds defined in this part are calibratable. This function is calibrated so as to deactivate the stop-and-start function before exceeding the OBD thresholds.

As soon as the value of "Sum Ti" exceeds the value of Threshold$_{EOBD}$, it is recognized as a fault, but this fault is not confirmed until the end of 3 consecutive driving cycles: a fault code is recorded, but the malfunction indicator light "MIL" is not illuminated.

The invention claimed is:

1. Method for identifying emissions thresholds for pollutant gases for purposes of controlling the stop-and-start mode operation of stopping an engine just before and during a motor vehicle standstill, comprising the following steps:
   calculating, at each restart, the quantity of fuel injected,
   calculating the difference between the quantity of fuel injected and the normal quantity of fuel needed, the resulting quantity being taken to represent the quantity of fuel injected but not burned,
   comparing said quantity of fuel injected but not burned to a preset threshold value based on the distance driven,
   deactivating or not the stop-and-start mode operation, according to whether or not said quantity of fuel injected but not burned is greater than the preset threshold value.

2. Method according to claim 1, wherein the quantity of fuel injected but not burned is calculated by iterative summation, in such a way as to calculate the sum of the fuel quantities injected but not burned for a series of restarts between two engine stops by means of the ignition key.

3. Method according to claim 2,
   wherein, each time the distance driven counter returns to zero, the value of the sum of the fuel quantities injected but not burned is reinitialized to a value obtained by subtracting a preset threshold value from said sum just before reinitialization when this difference is positive, and it is reinitialized to zero when said difference is negative.

4. Method according to claim 3, which is repeated over the course of at least three driving cycles, and it additionally comprises the following steps:
   recording each time said fuel quantity injected but not burned exceeds the preset threshold value,
   issuing a fault code if said threshold is exceeded for three driving cycles.

5. Method according to claim 2, which is repeated over the course of at least three driving cycles, and it additionally comprises the following steps:
   recording each time said fuel quantity injected but not burned exceeds the preset threshold value,
   issuing a fault code if said threshold is exceeded for three driving cycles.

6. Method according claim 1, which is repeated over the course of at least three driving cycles, and it additionally comprises the following steps:
   recording each time said fuel quantity injected but not burned exceeds the preset threshold value,
   issuing a fault code if said threshold is exceeded for three driving cycles.

* * * * *